US 6,690,927 B1

(12) United States Patent
Hupp et al.

(10) Patent No.: US 6,690,927 B1
(45) Date of Patent: Feb. 10, 2004

(54) DECT TRANSMIT-RECEIVE TERMINAL AND METHOD FOR COMMUNICATING BETWEEN A DECT TRANSMIT-RECEIVE TERMINAL AND A DECT BASE STATION

(75) Inventors: Juergen Hupp, Nuermberg (DE); Udo Stoermer, Erlangen (DE); Thomas Kleinhenz, Nuermberg (DE); Albert Heuberger, Erlangen (DE); Klaus Rebhan, Erlangen (DE); Frank Noether, Nuermberg (DE); Martin Tittel, Forchheim (DE); Heinz Gerhaeuser, Waischenfeld (DE)

(73) Assignee: Fraunhofer-Gessellschaft Zur Foerderung der Angewandten Forschung e.V., Munich (DE)

( * ) Notice: Subject to any disclaimer, the term of this patent is extended or adjusted under 35 U.S.C. 154(b) by 0 days.

(21) Appl. No.: 10/148,243

(22) PCT Filed: Nov. 16, 2000

(86) PCT No.: PCT/EP00/11381

§ 371 (c)(1),
(2), (4) Date: Oct. 8, 2002

(87) PCT Pub. No.: WO01/41330

PCT Pub. Date: Jun. 7, 2001

(30) Foreign Application Priority Data

Nov. 30, 1999 (DE) .......................... 199 57 595
Nov. 30, 1999 (DE) ...................... 299 21 022 U

(51) Int. Cl.[7] .............................. H04B 1/06; H04B 7/00
(52) U.S. Cl. .................... 455/277.1; 455/101; 455/133; 455/562.1
(58) Field of Search ................................ 455/101, 133, 455/134, 140, 275, 277.1, 277.2, 462, 465, 78, 562.1, 561, 135, 279.1

(56) References Cited

U.S. PATENT DOCUMENTS 5,241,701 A    8/1993  Andoh
5,613,219 A  * 3/1997  Vogel et al. ................. 455/101
5,960,046 A  * 9/1999  Morris et al. ................ 370/337
5,991,613 A  * 11/1999 Euscher et al. ........... 455/277.1
6,301,236 B1 * 10/2001 Schreib et al. .............. 455/101
6,553,078 B1 * 4/2003  Akerberg ................. 455/277.1

FOREIGN PATENT DOCUMENTS

| DE | 44 21 643 C2 | 1/1996 |
| EP | 0 620 657 A1 | 10/1994 |
| EP | 0 755 131 A2 | 6/1996 |
| WO | PCT/EP93/02807 | 5/1994 |
| WO | PCT/US93/11777 | 7/1994 |
| WO | PCT/SE95/00786 | 2/1996 |
| WO | PCT/US98/27616 | 7/1999 |
| WO | PCT/US98/27617 | 7/1999 |
| WO | PCT/SE99/00021 | 7/1999 |

OTHER PUBLICATIONS

International Search Report dated Mar. 8, 2001 (in German).

Pilger, Ulrich: Struktur des DECT–Standards, Nachrichtentech, Elektron, Berlin 42 (1992), pp. 23–29.

* cited by examiner

Primary Examiner—Nay Maung
Assistant Examiner—John J Lee
(74) Attorney, Agent, or Firm—Vedder, Price, Kaufman & Kammholz, P.C.

(57) ABSTRACT

A DECT transmit-receive terminal comprises a plurality of transmit-receive antennas for communicating with a DECT base station, a device for determining the quality of a communications connection between the DECT transmit-receive terminal and the DECT base station, and a means for switching over from one transmit-receive antenna to another transmit-receive antenna, said switch-over means being connected to the determining device for switching over if the quality of the communications connection is below a predetermined threshold. An antenna diversity effect is thus realized for the DECT transmit-receive terminal by means of which the transmission quality of the communications connection is improved.

9 Claims, 2 Drawing Sheets

DECT TRANSMIT-RECEIVE TERMINAL AND METHOD FOR COMMUNICATING BETWEEN A DECT TRANSMIT-RECEIVE TERMINAL AND A DECT BASE STATION

FIELD OF THE INVENTION

The present invention relates to digital message communication according to the DECT standard and, in particular, to a transmit-receive terminal provided for a connection-oriented communication system according to the DECT standard or according to a derivative thereof, as well as to a method for communicating between a transmit-receive terminal and a base station by means of which the communications connection can be improved.

The ETSI DECT standard (DECT=Digital Enhanced Cordless Telecommunications) provides for digital transmission of voice signals as well as for digital transmission of data. This standard (ETS 300 175, parts 2–3) describes both the physical layer, which is also referred to as PHL, and the medium access control layer, which is also referred to as MAC, of a digital communication system. The DECT concept operates as a centrally controlled system in the case of which mobile units synchronize themselves with one or a plurality of base stations.

In the following, a survey of the overall structure of a communications connection between a first mobile unit 32 and a second mobile unit 34 will be described making reference to FIG. 3. It is assumed that the mobile unit 32 is held by a first subscriber and the mobile unit 34 by a second subscriber, and that both subscribers want to communicate via a DECT system at the first subscriber's premises, i.e. the mobile unit 32, as well as at the second subscriber's premises, i.e. the mobile unit 34.

Larger telephone installations consist e.g. of DECT systems in an office building, which are implemented such that persons who stay in the building possess a cordless DECT mobile unit 32 and 34, respectively. If e.g. several persons possessing a DECT mobile unit are accommodated in one office, this office will also be equipped with a base station 30a-30d so that the radio signals received by a DECT mobile unit or sent to a DECT mobile unit only have to be transmitted over the comparatively short distance, in relation to the total connection, between a respective mobile unit and the base station arranged within radio reach, whereupon they are fed into a permanently wired line 12 via respective converters in the base station.

All the DECT base stations 30a–30d, which are accommodated e.g. in individual offices, or in the individual storeys of a multis-torey office building, are permanently wired to a respective central DECT exchange 10. The exchange 10 is therefore the interface between the DECT system of the office building and the "outside world", i.e. the public ISDN telecommunications network, the public analog network, a current distribution network or some other network through which data are transmitted. This other network may e.g. also be the internet. The "outside world" or rather the network in question is generally referred to as channel 38 in FIG. 3.

FIG. 3 therefore shows the situation in which both parties participating in a telephone conversation hold a DECT mobile unit in their hands. It goes without saying that one party may have a DECT mobile unit on one side, whereas on the other side there may be a party participating in the conversation who has some other terminal device.

In the following, a description will be given of the communication taking place between the DECT mobile unit 34 and the base station 30c when it is assumed that the DECT mobile unit 34 is arranged in the vicinity of the base station 30c and is intended to communicate with this very base station 30c according to the protocol.

In the ETSI DECT standard (ETS 300 175) it is specified that a base station is provided with a first transmit-receive antenna 31a and that a base station may additionally have a second receive antenna 31b so as to achieve an antenna diversity in the communication between the base station and the mobile unit 34. The antenna diversity with two antennas in the base station 30c serves to improve the transmission reliability between the base station 30c and the mobile unit 34. Analogously, also the base station 30a may comprise a first transmit-receive antenna 31c and a second transmit-receive antenna 31d so as to achieve an antenna diversity also in the communication with the mobile unit 32.

The concept described in the ETSI DECT standard is disadvantageous insofar as, in spite of the diversity possibility provided in the base station in order to improve the transmission quality, the transmission qualities achieved are still not always satisfactory.

DECT mobile units may also be self-sufficient mobile units without any subscriber, such as sensors for various purposes, operating units, printers, monitoring devices and the like. Certain self-sufficient mobile units, and in particular special sensors, may be fixedly installed. If the quality of the communications connection between the mobile unit and the base station is here poor, the so-called "human control loop" does not exist.

When telephones are considered, a telephone subscriber will, in the case of a poor communications connection, almost intuitively change position in the sense of the "human control loop" so as to obtain a better transmission quality. This possibility does, however, not exist in the case of self-sufficient mobile units having no operator.

Fixedly installed mobile units additionally entail the problem that they are fixedly installed once and for all and that they must then communicate at this fixed position. When the mobile unit is being installed, the directional characteristic of the mobile unit with respect to the base station is not necessarily taken into account. It may therefore happen that the mobile unit is installed at a position which is so unfavourable that its antenna lobe is positioned very badly with respect to the base station with which the mobile unit is intended to communicate. In this case and also in the case of a mobile self-sufficient unit, the antenna diversity of the base station will remedy the problems in question only to a very limited extent.

It is the object of the present invention to improve the transmission quality between a base station and a mobile unit in a system operating according to the DECT standard or according to a derivative of the DECT standard.

In accordance with a first aspect of the present invention, this object is achieved by a transmit-receive terminal for a connection-oriented communication system operating according to the DECT standard or according to a derivative thereof, said transmit-receive terminal being implemented for communicating with a base station provided with a plurality of transmit-receive antennas, comprising: a plurality of transmit-receive antennas for communicating with a base station; a device for determining the quality of a communications connection between the transmit-receive terminal and the base station; and a switch for switching over from one transmit-receive antenna to another transmit-receive antenna, said switch being effective for switching over if the quality of the communications connection is below a pre-determined threshold, said switch being arranged for switching over from one transmit-receive antenna to the other transmit-receive antenna with a time constant which differs from a time constant with which a change from one transmit-receive antenna of the base station to another transmit-receive antenna of the base station is effected in the base station.

In accordance with a second aspect of the present invention, this object is achieved by a method for communicating between a transmit-receive terminal including at least two transmit-receive antennas and provided for a connection-oriented communication system, which operates according to the DECT standard or according to a derivative thereof, and a base station provided with a plurality of transmit-receive antennas, comprising the following steps: transmitting/receiving by means of the transmit-receive terminal making use of a transmit-receive antenna; determining in said transmit-receive terminal the quality of the communications connection; and switching over from one transmit-receive antenna to another transmit-receive antenna if the quality of the communications connection is below a pre-determined threshold, said switching over from one transmit-receive antenna to the other transmit-receive antenna being effected with a time constant which differs from a time constant with which a change from one transmit-receive antenna of the base station to another transmit-receive antenna of the base station is effected in the base station.

The present invention is based on the finding that the transmission channel between a base station and a mobile unit or transmit-receive terminal is not symmetric, i.e. that the propagation characteristic of the channel from the mobile unit to the base station will not always correspond to the propagation characteristic from the base station to the mobile unit and that the use of an antenna-diversity concept in the base station will therefore not always suffice, although it will provide certain advantages. According to the present invention, a DECT mobile unit is therefore provided, which comprises at least two transmit-receive antennas; depending on the quality of the transmission channel, switching over from one transmit-receive antenna to the other transmit-receive antenna in the mobile unit can be effected so that an antenna-diversity concept is realized in the mobile unit. This switchover can be effected independently of the transmission direction so that a mobile unit may easily use one antenna for transmitting and the other antenna for receiving, when the number of antennas is equal to two.

Antennas normally have an antenna gain, i.e. there are directions where the receive-transmit qualities are better and directions where they are not so good. Devices whose position of use is indefinite or cannot be changed, as in the case of DECT mobile units which have a fixedly installed antenna and with regard to which it is impossible to predict at which position they will be held during transmitting/receiving, entail disadvantages insofar as an omnidirectional reception is not possible. According to the present invention, the mobile unit, whose actual use and whose positioning during transmitting/receiving are completely indefinite—this being due to the fact that it is a mobile transmit-receive unit—is provided with a second transmit-receive antenna in such a way that the overall antenna gain characteristic of the DECT mobile unit will so to speak at least be approximately equal to an omnidirectional antenna gain characteristic. Even if, as in the case of the prior art, an antenna diversity is already provided in the DECT base station, this will not alter the antenna gain characteristic of the DECT mobile unit having only a single antenna. Even if two or more transmit-receive antennas are provided in the DECT mobile unit, the antenna gain characteristic of the DECT mobile unit can be given a value approximately equal to that of an antenna gain characteristic which is at least similar in every direction, provided that the communications connection is simultaneously supervised with regard to its quality and provided that, if necessary, i.e. if the quality is not good enough, switching over from one antenna to another antenna is effected.

When used in connection with self-sufficient mobile units and especially in connection with fixedly installed self-sufficient mobile units, the antenna-diversity concept offers the special advantage that the quality of the communications connection will here be improved although a human control loop does not exist. Provided that the antennas are arranged in a suitable manner, the antenna characteristic need not be taken into account at all in the case of fixedly installed mobile units, but the mobile units can be installed according to other requirements and the possibilities of installing them are not limited by HF properties.

In addition, multipath propagation of the transmit signal leads to signal superposition at the receive point. In the most disadvantageous case, this will cause an extinction of the signal. A further antenna on the DECT mobile unit, which is arranged e.g. orthogonally to the already existing antenna, or which is arranged at an advantageous distance, e.g. a non-even multiple of a quarter of the transmit wavelength, serves to reduce or even prevent multipath propagation and destructive superposition at the receive point so that a good transmission quality will be guaranteed even if the transmission channels in question are, in principle, disadvantageous. Summarizing, it can be stated that the transmission channel between the base station and the mobile unit is not symmetric and that, consequently, an antenna-diversity concept in the base station, of the type suggested in the standard, will not thoroughly remedy destructive superposition at the DECT mobile unit.

A further advantage of the diversity concept for the DECT mobile unit according to the present invention is to be seen in the fact that no modifications will be necessary at the base station or the exchange. When, in the case of comparatively small systems, the base station is directly connected to the network, without any separate exchange being provided, modifications of fixedly installed means will not be necessary either. What will be necessary are only modifications of mobile units, or new mobile units, which can be bought separately.

In addition, protocol modifications or the like, which would have to be adapted to the DECT standard, can be dispensed with as well; it will suffice to provide a second antenna on the mobile unit and respective means for determining the quality of the communications connection and for switching over between the antennas, if the quality should be below a specific quality. Hence, the DECT protocol will not "notice" the antenna diversity in the mobile unit. It follows that, according to the present invention, an improvement of the transmission quality will be achieved, without the respective layers (PHL and MAC) of the DECT standard being affected. This has the advantage that the DECT mobile units implemented according to the present invention are in full conformity with the standard and can therefore also be offered and sold as devices conforming with the standard.

The quality of the communications connection can be supervised in an arbitrary manner, e.g. by the error recognition in the mobile unit which is carried out anyway, or by means of information which is already transmitted from the base station to the DECT mobile unit according to the standard, so as to transmit to the DECT mobile unit a "feedback" via the receive channel as seen from the base station. This feedback is transmitted via the Q1/Q2 bits in the A field. Other possibilities, such as field strength measurements in the DECT mobile unit on an analog level and the like, can also be integrated in a manner conforming to the standard. Also a signalling from the base station to the mobile unit which does not conform to the standard is imaginable; such signalling is, however, disadvantageous insofar as modifications in the individual base stations may also be necessary.

It should here be pointed out that the expression "mobile unit" comprises not only mobile phones but also other mobile transmit-receive devices, which have been enumerated at the beginning. In particular, the term "mobile unit" is, however, meant to comprise fixedly installed mobile units communicating via a radio channel with the base station and representing therefore terminals of a DECT system.

In addition, it should also be pointed out that the present invention is applicable not only to European DECT systems, which define a band of from 1.88 GHz to 1.9 GHz in the physical layer, but also to connection-oriented communication systems according to so-called DECT derivatives, such as the American derivative which operates in the range of from approx. 1.92 to 1.93 GHz and which is referred to as PWT. Furthermore, there are also Asian DECT derivatives which have still another frequency band. A feature which is common to all the DECT derivatives is that information transmission is effected according to the DECT standard. They only differ with regard to the physical parameters of the radio frequency band used or with regard to the modulation, which may differ from one derivative to the next.

BRIEF DESCRIPTION OF THE DRAWING

In the following, preferred embodiments of the present invention will be explained in more detail making reference to the drawings enclosed, in which:

FIG. 1 shows a DECT mobile unit 50 according to the present invention comprising a first transmit-receive antenna 52 and a second transmit-receive antenna 54 which are connected to a switch 56 arranged for transmitting the transmit signal or the receive signal on a line 58 either to the first transmit-receive antenna 52 or to the second transmit-receive antenna 54 or for receiving this transmit or receive signal from these antennas 52, 54. The DECT mobile unit additionally comprises a central unit 60 which is referred to as CPU and which carries out the usual functions, such as error recognition, so as to execute e.g. an ARQ process (ARQ=Automatic Repeat Request). In addition, the usual function of converting voice signals or data signals into transmittable signals is carried out in the central unit 60.

Figure 1:
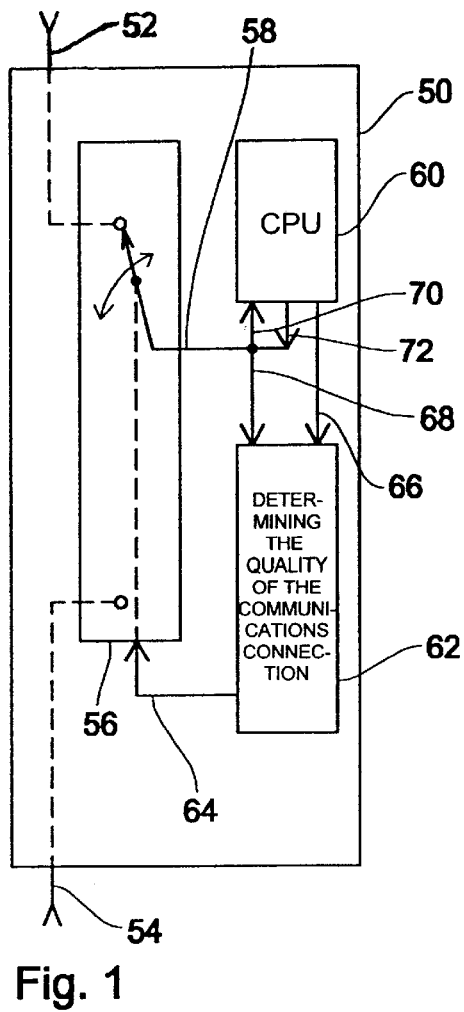
FIG. 1 shows a schematic block diagram of a DECT mobile unit according to the present invention.

The DECT mobile unit 50 according to the present invention additionally comprises a device 62 for determining the quality of the communications connection between the DECT mobile unit and a DECT base station so as to activate the switch-over means 56 via a control line 64 in response to the quality of the communications connection for switching over from one transmit-receive antenna to the other transmit-receive antenna.

Depending on the respective implementation, the device 62 for determining the quality of the communications connection can either be coupled directly to the central unit via a line 66 so as to determine the quality of the communications connection in dependence upon the error examination executed according to the DECT standard in the central unit of the mobile unit. Alternatively, the device 62 for determining the quality of the communications connection is also able to gather information from the received signal so as to determine the quality of the communications connection between the DECT mobile unit and the DECT base station on the basis of the feedback information of the base station.

It goes without saying that the device 62 can also be integrated in the unit 60, the functionalities being in this case, however, the same.

The central unit 60 is connected to the antennas via a receive path 70 and a transmit path 72.

Depending on the respective embodiment, the device 62 for determining the quality of the communications connection can be arranged such that it will switch over between the antennas in response to the receive quality in the DECT mobile unit, or in response to the receive quality in the DECT base station. The flow diagram of FIG. 2A refers to the first case, whereas the flow diagram in FIG. 2B refers to the last-mentioned case.

In the following, FIG. 2A, in which the quality of the communications connection is judged on the basis of the receive quality in the DECT mobile unit, will be discussed in detail. It is known that, according to the DECT standard, data transmission takes place in packets. The data packets are here organized in so-called "frames". According to a preferred embodiment of the present invention, the device 62 examines two successive frames at a time so as to determine, in dependence upon error examination signals, which the central unit 60 supplies making use e.g. of a CRC test (CRC=Cyclic Redundancy Check), whether two successive frames each included an unsound data packet, i.e. a data packet which could no longer be received and decoded with the maximum admissible bit error rate e.g. due to an interfering noise or a multipath propagation and destructive superposition at the transmit-receive antenna which is just being used. If there were two successive frames which each included at least one unsound data packet, the switch-over means 56 is activated by the device 62 via the control line 64 so as to switch over to the at least one other transmit-receive antenna. If the data packets received in a frame were all sound, there is no necessity of switching over, since the quality of the communications connection is sufficiently high.

Figures 2A, 2B:
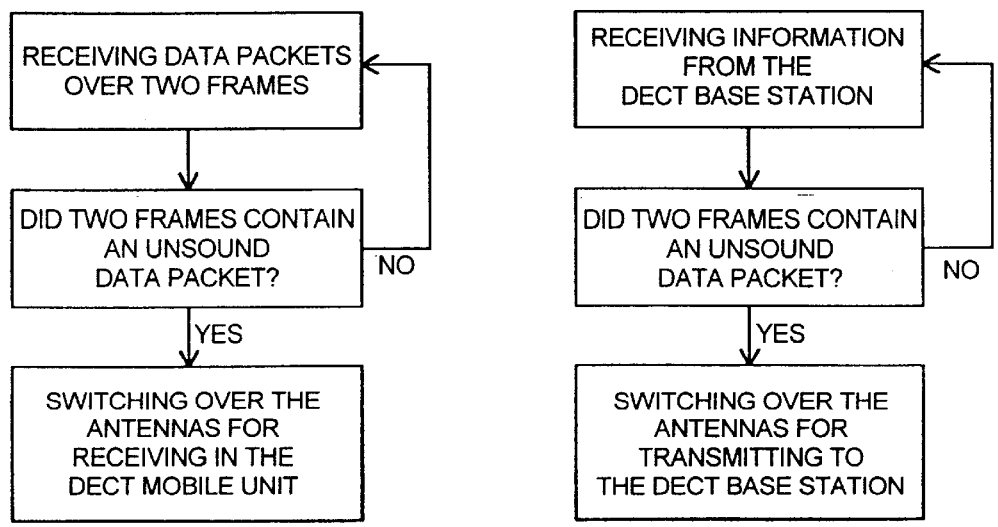
FIG. 2A shows a flow diagram for describing the function of the DECT mobile unit shown in FIG. 1.
FIG. 2B shows a flow diagram for describing an alternative mode of operation of the DECT mobile unit shown in FIG. 1.

The measure of the quality of the communications connection, which leads to switching over if the quality of the communications connection is no longer achieved in the embodiment of the present invention described with respect to FIG. 2A, is that unsound data packets were contained in two successive frames. The present invention is, however, not limited to this predetermined measure. Switchover may already be effected if a faulty packet occurs in one frame, or also if a certain number of successively received data packets was faulty. Arbitrary alternatives and combinations, e.g. with the received field strength at the receive antenna, are possible as well.

The mode of operation described in FIG. 2A refers to the fact that switchover from one antenna to the other antenna is effected in the DECT mobile unit in response to the reception quality at the DECT mobile unit. Alternatively, switchover can also be effected in response to the reception quality in the DECT base station. For this purpose, information can be used, which is transmitted as "feedback" information by the DECT base station. This information informs the DECT mobile unit about the quality with which the data transmitted by the DECT mobile unit have arrived at the DECT base station. The same predetermined measure of the quality of the communications connection which has been used in the case discussed with respect to FIG. 2A can also be used in the present case, but now related to the reception in the DECT base station. According to a further embodiment of the present invention, both concepts can also be combined so that the quality of the communications connection is determined on the basis of the reception in the DECT mobile unit as well as in the DECT base station.

Figure 3:
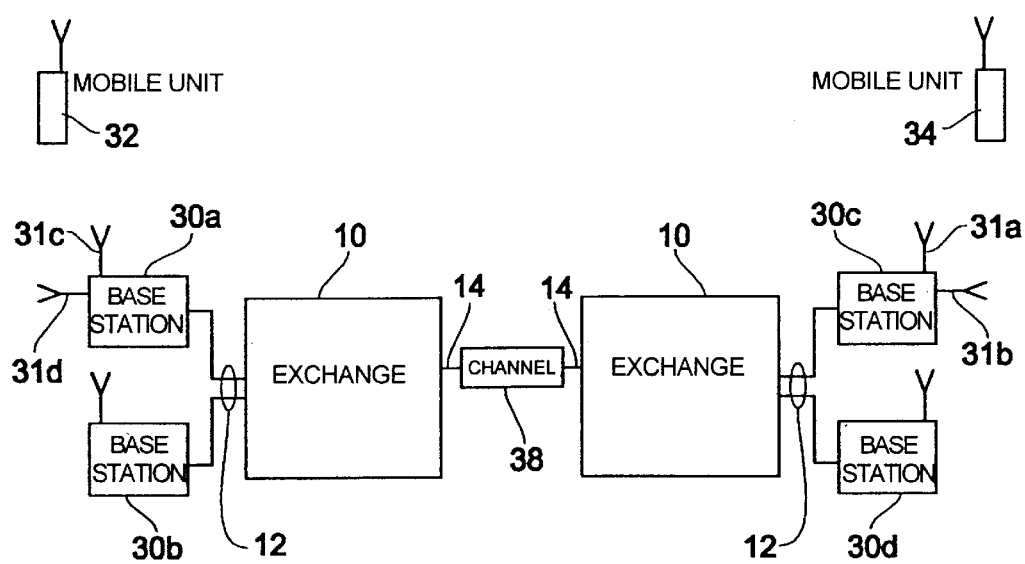
FIG. 3 shows a survey diagram of a communications connection between a first subscriber having a DECT mobile unit and a second subscriber having a DECT mobile unit.

If the DECT base station with which the DECT mobile unit according to the present invention communicates is implemented such that it is provided with two transmit-receive antennas between which switchover can be effected, it will be advisable to observe certain time constants when switching over is effected between the antennas in the DECT mobile unit so as to avoid undesirable oscillations when switching over between the antennas is effected in the base station and in the mobile unit. The DECT standard provides the possibility of switching over in the base station from one frame to the other frame between the antennas 31a, 31b (FIG. 3), i.e. that switching over takes place with very short time constants. In order to avoid oscillation problems, the predetermined measure of the quality of the communications connection can either be determined such that two successive frames at a time are examined, whereby a longer time constant for switching over will be obtained automatically. Alternatively, a filter may, however, be provided in the control line 64 so as to suppress excessively fast switching over which would normally be carried out due to the predetermined measure of the quality of the communications connection and so as to permit only slower switching over. Fundamentally, it can be stated that, for overcoming the oscillation problems, preferably the switch-over time constants in the base station and in the mobile unit should differ from one another. However, even if the time constants should actually be equal, certain precautionary measures could still be taken, if oscillation problems occurred; this could be determined e.g. on the basis of a periodic recurrence of unsound data packets.

What is claimed is:

1. A transmit-receive terminal for a connection-oriented communication system operating according to the DECT standard or according to a derivative thereof, said transmit-receive terminal being implemented for communicating with a base station provided with a plurality of transmit-receive antennas, comprising:
   a plurality of transmit-receive antennas for communicating with a base station;
   a device for determining the quality of a communications connection between the transmit-receive terminal and the base station; and
   a switch for switching over from one transmit-receive antenna to another transmit-receive antenna, said switch being effective for switching over if the quality of the communications connection is below a predetermined threshold,
   said switch being arranged for switching over from one transmit-receive antenna to the other transmit-receive antenna with a time constant which differs from a time constant with which a change from one transmit-receive antenna of the base station to another transmit-receive antenna of the base station is effected in the base station.

2. A transmit-receive terminal according to claim 1, wherein the device for determining the quality of the communications connection is arranged for examining data packets received from the base station with regard to their integrity so as to determine the quality of the communications connection on the basis of the integrity of the packets received,
   the predetermined threshold being a predetermined number of unsound packets within a certain period of time.

3. A transmit-receive terminal according to claim 2, wherein the predetermined threshold of the quality of the communications connection is defined by two unsound data packets received in succession.

4. A transmit-receive terminal according to claim 2, wherein the switch is arranged for switching over from one transmit-receive antenna to another transmit-receive antenna for receiving only data packets from the base station.

5. A transmit-receive terminal according to claim 1, wherein the determining device is arranged for evaluating information received from the base station with regard to the integrity of data packets received from said base station so as to determine the quality of the communications connection on the basis of the information received.

6. A transmit-receive terminal according to claim 5, wherein the predetermined threshold of the quality of the communications connection is defined by two unsound data packets received from the base station in succession.

7. A transmit-receive terminal according to claim 3, wherein, instead of the two successive unsound data packets, two successive time frames in which no correct packet is determined are used.

8. A transmit-receive terminal according to claim 1, which is a self-sufficient terminal and especially a fixedly installed self-sufficient terminal.

9. A method for communicating between a transmit-receive terminal including at least two transmit-receive antennas and provided for a connection-oriented communication system, which operates according to the DECT standard or according to a derivative thereof, and a base station provided with a plurality of transmit-receive antennas, comprising the following steps:
   transmitting/receiving by means of the transmit-receive terminal making use of a transmit-receive antenna;
   determining in said transmit-receive terminal the quality of the communications connection; and
   switching over from one transmit-receive antenna to another transmit-receive antenna if the quality of the communications connection is below a predetermined threshold, said switching over from one transmit-receive antenna to the other transmit-receive antenna being effected with a time constant which differs from a time constant with which a change from one transmit-receive antenna of the base station to another transmit-receive antenna of the base station is effected in the base station.

* * * * *